W. McCOMBIE.
MECHANICAL MOVEMENT.
No. 175,129. Patented March 21, 1876.
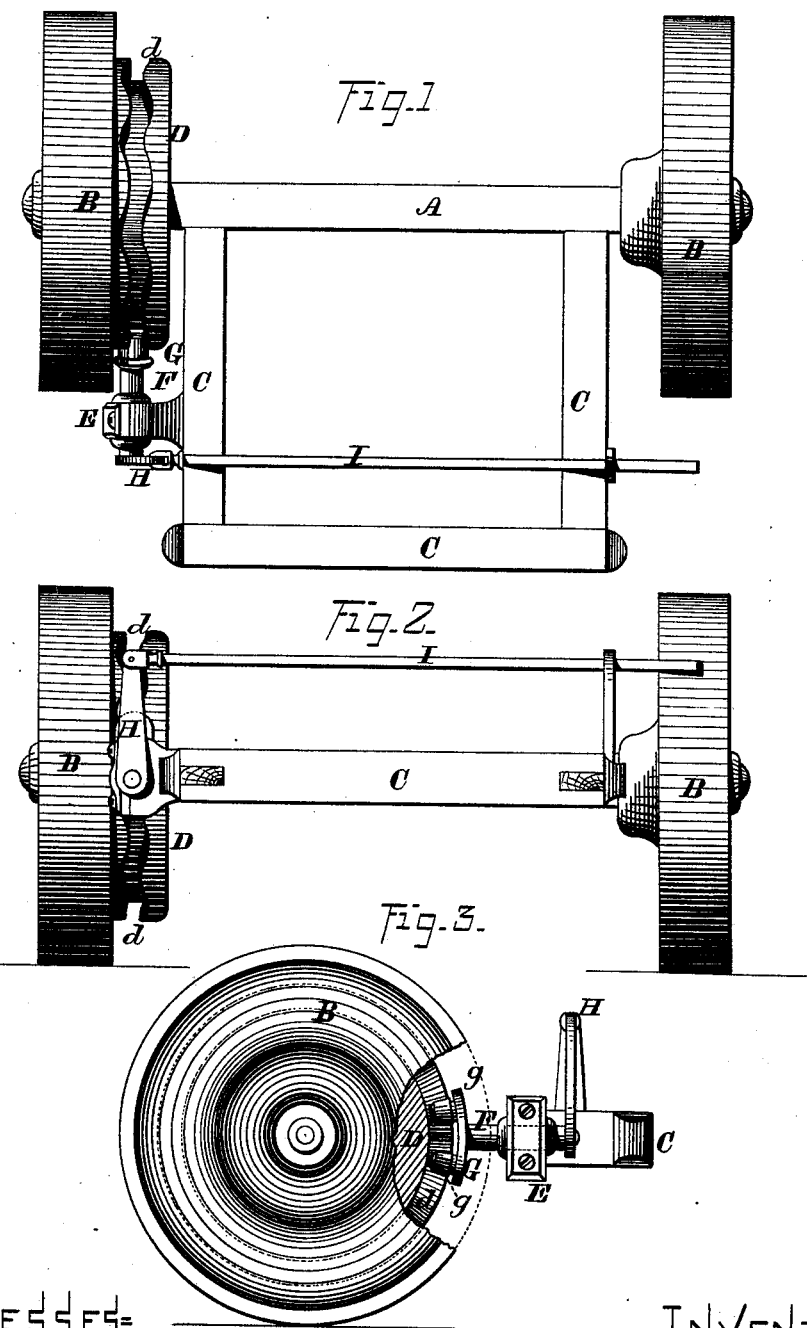

UNITED STATES PATENT OFFICE.

WILLIAM McCOMBIE, OF CHICAGO, ILLINOIS.

IMPROVEMENT IN MECHANICAL MOVEMENTS.

Specification forming part of Letters Patent No. 175,129, dated March 21, 1876; application filed January 3, 1876.

*To all whom it may concern:*

Be it known that I, WILLIAM McCOMBIE, of Chicago, in the county of Cook, and in the State of Illinois, have invented certain new and useful Improvements in Mechanical Movements; and do hereby declare that the following is a full, clear, and exact description thereof, reference being had to the accompanying drawings, making a part of this specification, in which—

Figure 1 is a plan view of the upper side of my device. Fig. 2 is a front elevation of the same; and Fig. 3 is an end elevation, a portion of one of the traction-wheels being broken away to show the operative mechanism.

Letters of like name and kind refer to like parts in each of the figures.

The design of my invention is to enable a rotary motion to be converted into a reciprocating motion without material loss of power or causing an undue strain or wear of parts; to which end it consists in the employment within a serpentine groove formed within the periphery of a revolving disk of a double crank, which extends equally above and below its shaft, and engages at each end with the sides of said groove, so as to cause the pressure upon the bearings of said shaft to be equalized, substantially as is hereinafter specified.

My invention is capable of use wherever it is necessary that a rotary motion should be converted into a reciprocating motion, but for convenience I will show its application to a harvester.

In the annexed drawings, A represents the axle of a harvester supported by means of two ground-wheels, B and B, which are journaled upon its ends, and having attached to or upon its central portion a frame, C, of any desired shape or form. Secured to or upon the inner face of one of the ground-wheels B is a disk, D, which has a somewhat less diameter than said wheel, and is provided within its periphery with a groove, $d$, that has parallel sides, and, longitudinally, is formed upon a serpentine line. Journaled within a suitable bearing, E, is a short shaft, F, which is placed in a line radially with the transverse center of the groove $d$, and upon its end contiguous to said groove is provided with an arm, G, that has a right angle to the line of said shaft, and extends outward in opposite directions to equal distances therefrom. Within the inner face of the arm G, at its ends, are provided two studs, $g$ and $g$, which have each a diameter substantially equal to the transverse dimensions of the groove $d$, and extend inward into the latter. If desired, each stud $g$ may be reduced in diameter sufficiently to enable a friction-roller to be journaled thereon, in which case said roller must have such external dimensions as to cause it to loosely fill said groove.

If, now, the machine be moved so as to cause said ground-wheels and the disk D to revolve, the shaft F will be given a partial rotation in each direction, as in case of similar mechanism in which the serpentine groove is employed; but as the distance between the crank-pins $g$ and $g$ just equals the space between any two of its contiguous reverse curves it will be seen that said pins will be simultaneously moved in opposite directions, and, through their double-crank arm G, will operate to rotate said shaft in the same direction.

The distance of each pin $g$ from the center of the shaft F being exactly the same as that of the opposite pin, it will be seen that the force transmitted through them will be equal, and that, consequently, there will be no side pressure upon said shaft, and the latter will move as freely within its bearing as though entirely disconnected from other mechanism.

From the shaft F the power is transmitted to the cutter-bar by means of a crank, H, and rod I, or other equivalent means.

Having thus fully set forth the nature and merits of my invention, what I claim as new is—

In combination with a serpentine groove, $d$, formed within the periphery of a revolving disk, D, a double crank, G, $g$, and $g$, secured to or upon the end of a shaft, F, extending to equal distances therefrom, and arranged to engage with said groove, whereby each arm of said crank is directly moved in each direction by the sides of said groove, substantially as and for the purpose specified.

In testimony that I claim the foregoing I have hereunto set my hand this 30th day of November, 1875.

WILLIAM McCOMBIE.

Witnesses:
AUGUST NELSON,
JOHN BECK.